United States Patent
Brandt et al.

(10) Patent No.: US 9,853,302 B2
(45) Date of Patent: Dec. 26, 2017

(54) ELECTROCHEMICAL CELL

(75) Inventors: Torsten Brandt, Forchheim (DE); Frank Baernreuther, Nuremberg (DE); Armin Datz, Poxdorf (DE); Anett Eder, Erlangen (DE); Florian Eder, Erlangen (DE); Herbert Hartnack, Erlangen (DE); Joachim Hoffmann, Burgthann (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 366 days.

(21) Appl. No.: 14/345,361

(22) PCT Filed: Aug. 16, 2012

(86) PCT No.: PCT/EP2012/066000
§ 371 (c)(1),
(2), (4) Date: Mar. 17, 2014

(87) PCT Pub. No.: WO2013/037595
PCT Pub. Date: Mar. 21, 2013

(65) Prior Publication Data
US 2014/0349207 A1    Nov. 27, 2014

(30) Foreign Application Priority Data
Sep. 16, 2011    (EP) ..................... 11181641

(51) Int. Cl.
*H01M 8/0228*    (2016.01)
*H01M 8/02*    (2016.01)
(Continued)

(52) U.S. Cl.
CPC ..... *H01M 8/04029* (2013.01); *H01M 8/0228* (2013.01); *H01M 8/0267* (2013.01);
(Continued)

(58) Field of Classification Search
None
See application file for complete search history.

(56) References Cited

U.S. PATENT DOCUMENTS 7,153,605 B2 * 12/2006 Horiguchi ........... H01M 8/0206
429/437
8,137,866 B2    3/2012 Suzuki et al.
(Continued)

FOREIGN PATENT DOCUMENTS

| DE | 102007038171 A1 | 3/2008 |
| EP | 19093348 A1 | 4/2008 |
| JP | 2003197217 A | 7/2003 |

OTHER PUBLICATIONS http://de.wikipedia.org/wiki/Elektrochemische_Zelle (Sep. 15, 2011) [Electrochemical Cell].
(Continued)

*Primary Examiner* — Tracy Dove
(74) *Attorney, Agent, or Firm* — Laurence Greenberg; Werner Stemer; Ralph Locher

(57) ABSTRACT

An electrochemical cell has at least one plate element which can be cooled by a liquid coolant, such as water. The plate element has a surface that can be wetted for the purpose of cooling with the coolant. The surface of the plate element in the electrochemical cell is configured such that a contact angle between the surface and the liquid coolant is less than 90°. In the method for producing the electrochemical cell an additional method step is carried out which influences the wettable surfaces of plate elements for cooling with coolant and by which a contact angle between the surface and the coolant is decreased.

15 Claims, 2 Drawing Sheets

(51) Int. Cl.
  *H01M 8/04029*  (2016.01)
  *H01M 8/0267*  (2016.01)
  *H01M 8/04007*  (2016.01)

(52) U.S. Cl.
  CPC .... *H01M 8/04067* (2013.01); *H01M 2250/00* (2013.01); *Y02P 70/56* (2015.11)

(56) References Cited

U.S. PATENT DOCUMENTS

| | | |
|---|---|---|
| 2003/0039875 A1 | 2/2003 | Horiguchi et al. |
| 2006/0003174 A1 | 1/2006 | Yashiki et al. |
| 2007/0102283 A1* | 5/2007 | Won .................. C23C 14/0036 204/192.12 |
| 2007/0154744 A1* | 7/2007 | Darling ............... H01M 8/0258 429/437 |
| 2007/0287057 A1 | 12/2007 | Elhamid et al. |
| 2009/0214915 A1* | 8/2009 | Kwon ................. H01M 8/0267 429/437 |
| 2009/0214927 A1 | 8/2009 | Dadheech et al. |
| 2010/0047647 A1 | 2/2010 | Abd Elhamid et al. |
| 2010/0285396 A1 | 11/2010 | Vyas et al. |
| 2011/0039190 A1 | 2/2011 | Owejan et al. |

OTHER PUBLICATIONS http://de.wikipedia.org/wiki/Brennstoffzelle (Sep. 15, 2011) [Fuel Cell].

* cited by examiner

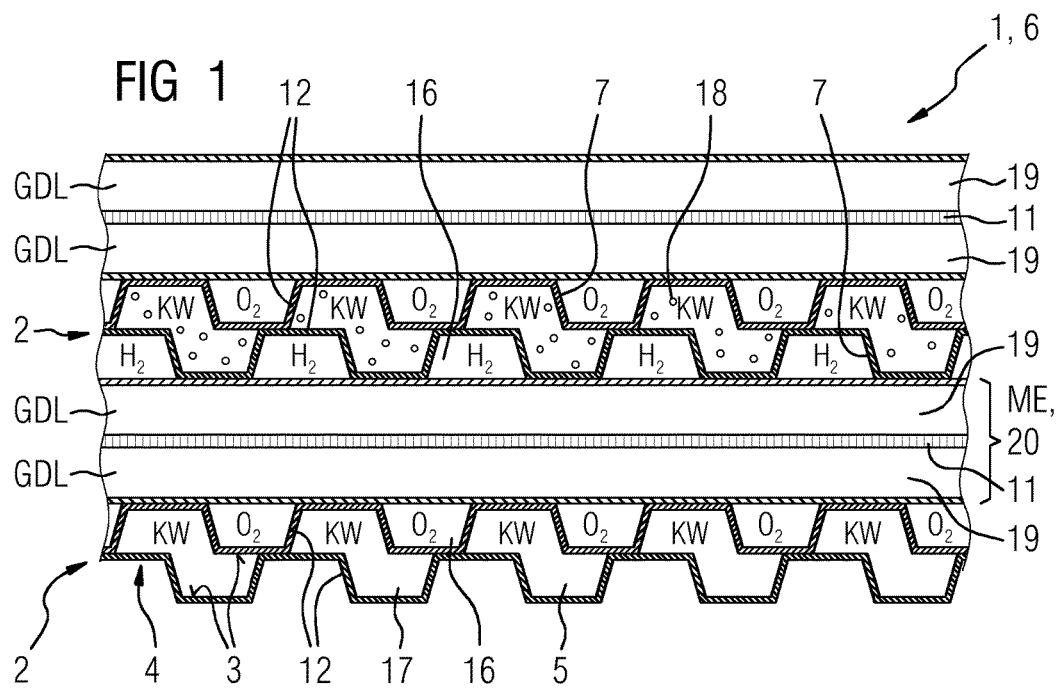
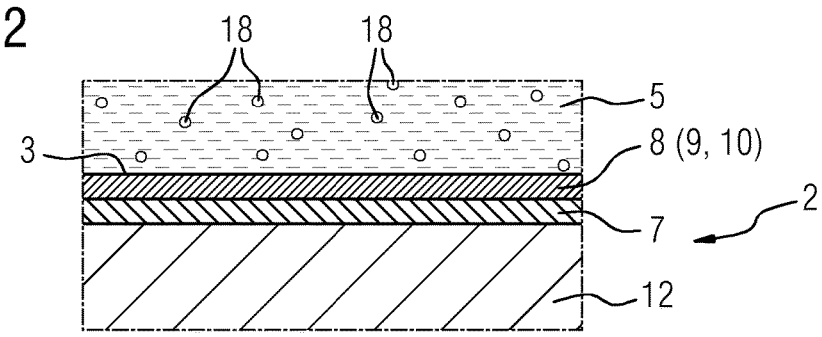

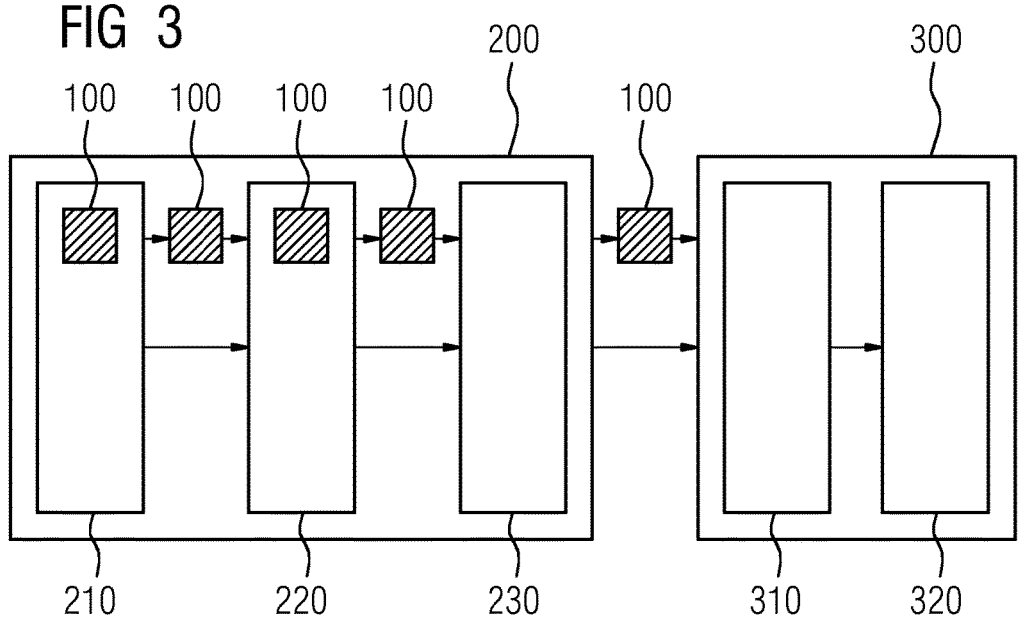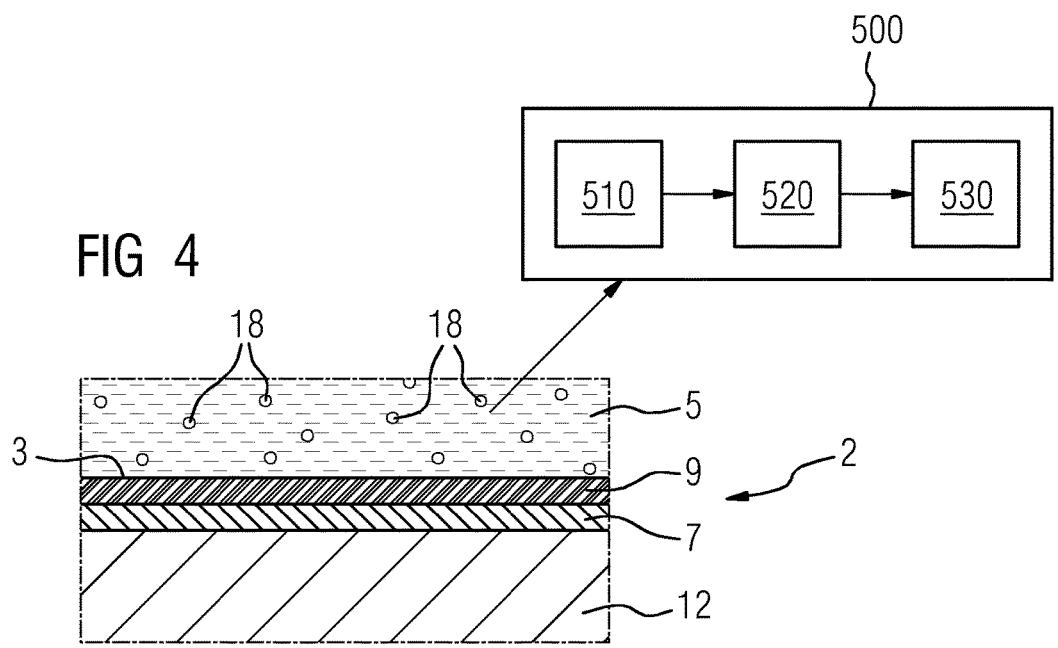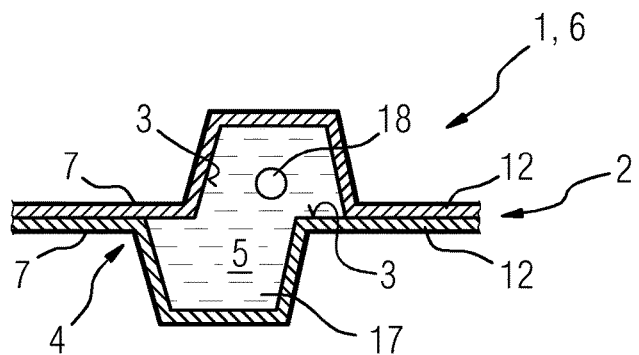

ELECTROCHEMICAL CELL

BACKGROUND OF THE INVENTION

Field of the Invention

The invention relates to an electrochemical cell having at least one plate element which can be cooled by means of a cooling liquid, said plate element having a surface which can be wetted with said cooling liquid for the purpose of cooling, as well as to a method for producing an electrochemical cell.

Electrochemical cells are generally known, for example from http://de.wikipedia.org/wiki/Elektrochemische_Zelle (15 Sep. 2011) (cf. http://en.wikipedia.org/wiki/Electrochemical_cell), and are subdivided into galvanic cells and electrolytic cells.

An electrolytic cell is a device in which an electric current forces a chemical reaction, with at least some electrical energy being converted into chemical energy.

A galvanic cell is a device—complementary to the electrolytic cell—for spontaneously converting chemical into electrical energy. A well-known device of such a galvanic cell is a fuel cell, for example a PEM fuel cell (proton exchange membrane fuel cell or polymer electrolyte membrane fuel cell) (http://de.wikipedia.org/wiki/Brennstoffzelle, 15 Sep. 2011 (cf. http://en.wikipedia.org/wiki/Fuel_cell)).

In a hydrogen-oxygen fuel cell, hydrogen (H2) and oxygen (O2) (fuel gases) react at an electrolyte, giving off heat in the process, to produce electrical energy and product water which—together with condensed-out humidification water—must be discharged from the fuel cell. This happens for example by purging the water from the fuel cell with surplus fuel gas. An active membrane and the electrodes surrounding it, i.e. an anode on one side (hydrogen side) and a cathode on the other side (oxygen side), (membrane electrode (ME) unit) of a PEM fuel cell must be supplied both on the anode side and on the cathode side evenly with the fuel gases (hydrogen (H2) and oxygen (O2)) in order to obtain the most homogeneous cell activity possible over the entire active surface.

Toward that end—in the case of a correspondingly layered structure of such a fuel cell having a plurality of such membrane electrode units—plate elements or bipolar plates are arranged in each case between the active membranes, the respective surface of said elements or plates acting as anode or, as the case may be, cathode and being provided on their surfaces, i.e. on the anode/hydrogen side or cathode/oxygen side, with channel structures effecting the supply with the fuel gases.

At the same time such a plate element or bipolar plate can also have an electrically conductive coating on its surfaces, a thin gold layer for example.

The heat resulting through the reaction of hydrogen (H2) and oxygen (O2) in the fuel cell requires the fuel cell to be cooled in order to prevent damage to the fuel cell, in particular damage to the active membrane. For cooling purposes the fuel cell is therefore supplied or flushed with cooling liquid, for example water, as a result of which heat can be dissipated from the fuel cell.

For this purpose the plate elements or bipolar plates can have cooling channels, for example boreholes, cooling ducts and suchlike, through which the cooling liquid flows and heat is thereby dissipated from the fuel cell.

It is also known to describe a wettability of a surface of a solid body by a liquid by means of a contact angle. In this case a distinction is made between a static contact angle and a dynamic contact angle, a further distinction being made in the case of the dynamic contact angle between a receding angle and an advancing angle.

A complete wetting or wettability is present at a contact angle of 0°, i.e. the liquid spreads out completely over the solid surface. Complete non-wetting or non-wettability is present at a contact angle of 180°, i.e. the liquid rolls off completely from the solid surface. A degree of wettability varies between these two states, complete wettability at contact angles of 0° and complete non-wettability at contact angles of 180°.

Methods for measuring a contact angle, for example a plate method according to Neumann, a Wilhelmy plate method or a drop method, are likewise well-known.

Electrochemical cells composed of layered plate elements are known from US 2007/287057 A1 and US 2009/214927 A1. Reactant channels are formed on surfaces of said plate elements, the surfaces thereof having contact angles of less than 30° or 40° and being provided with metal oxide layers in order to improve reactant transport.

An electrochemical cell composed of layered valve metal plates made from titanium is known from US 2010/047647 A1. A titanium oxide layer builds on surfaces of said valve metal plates in order to protect the metal underneath from attack by the environment and to tolerate higher voltages than stainless steels.

An electrochemical cell having layered plate elements, with coolant channels being embodied between the plate elements, is described in JP 2003 197217 A. According to JP 2003 197217 A, surfaces of the plate elements are provided with a hydrophilic structure in order to improve the dissipation of heat by way of the coolant.

An electrochemical cell having plate elements and cooling channels in the plate elements is known from US 2007/154744 A1. In order to improve the removal of gas bubbles in the cooling channels—in order thereby to reduce adhesion of the gas bubbles to the surfaces in the cooling channels and improve cooling efficiency—US 2007/154744 A1 provides special cross-sections of cooling channels in the plate elements which are intended to ensure an adequate coolant flow.

US 2006/003174 A1 describes a titanium alloy which has a noble metal component as well as titanium and can be used for example in bipolar plates of fuel cells.

BRIEF SUMMARY OF THE INVENTION

It is an object of the present invention to disclose an electrochemical cell, for example a galvanic cell or an electrolytic cell, in particular a fuel cell, in which heat being generated in the cell can be effectively dissipated and in which effective cooling of the cell can be achieved.

This object is achieved by means of an electrochemical cell and by means of a method for producing a chemical cell as claimed in the respective independent claim.

The electrochemical cell according to the invention has at least one plate element which can be cooled by means of a cooling liquid, in particular water, for example deionized water, said plate element having a surface which can be wetted by means of said cooling liquid for the purpose of cooling.

It is further provided according to the invention that the surface of the plate element is embodied in such a way that a contact angle between the surface and said cooling liquid wetting the surface is less than 90°.

To put it another way, the plate element surface is embodied in such a way that the contact angle between the surface and the respective cooling liquid used for cooling is less than 90°.

In this case the contact angle—according to known physical and customary general definition—can be a static or dynamic contact angle, in particular—in the case of a dynamic contact angle—a receding angle or an advancing angle.

In the method according to the invention for producing an electrochemical cell having a plurality of plate elements which can be cooled by means of cooling liquid and each of which has a surface which can be wetted by means of the cooling liquid in order to cool the respective plate element, the plate elements are produced in the first instance.

This can happen in particular in that the (double) metal sheets forming the plate elements are machined, for example by forming the metal sheets, in particular by deep-drawing and/or stamping, and coating the metal sheets with an electrically conductive layer, in particular a noble metal layer, such as a gold layer.

The produced plate elements are layered—alternately with membranes—to form membrane electrode units, as a result of which a layered structure of the electrochemical cell is produced.

It is furthermore provided according to the invention that an additional method steps influencing the plate element surfaces that are wettable for cooling purposes is performed by means of which a contact angle between the surface and the cooling liquid is reduced.

What is achieved in particular by means of said additional method step provided according to the invention for influencing the plate element surfaces that are wettable for cooling purposes is that a contact angle between the surface and the cooling liquid wetting the surface, for example water, in particular deionized water, is less than 90°.

What is to be understood according to the invention in this context by "said additional method step influencing the plate element surfaces that are wettable for cooling purposes" is that said method step is provided in addition to the manufacturing steps in the manufacture of functionally viable layered membrane electrode units of a cell.

It is also intended to be implicit therein that "said additional method step influencing the plate element surfaces that are wettable for cooling purposes" is provided as an alternative to a (previous) manufacturing step or as a modification of a (previous) manufacturing step in the manufacture of the functionally viable layered structure of a cell.

Put in simplified terms, where previously the production of an electrochemical cell made provision for the production of the plate elements and their layering with the membranes in order to produce the layered cell structure, there is provided according to the invention a supplementary, alternative or modified step during said production, which step influences the plate element surfaces that are wettable for cooling purposes in such a way that the contact angle between the surfaces and the cooling liquid is reduced.

"Modified method step", within the meaning of the additional method step, is intended to mean that said additional method step can consist in a modified production step, which modification then effects the influencing of the surface according to the invention with reduction of the contact angle. Modification, in this context, means in particular that the previous, but now to be modified method step is substantially retained, with changes being provided therein or proceeding therefrom which effect the influencing of the surface according to the invention with reduction of the contact angle.

By this it can be understood for example that a previous coating step continues to be performed as such, though a coating material, such as an alloy, is modified or its composition changed by replacing and/or adding a new material component or alloy component.

According to the invention this then causes the plate element surfaces that are wettable for cooling purposes to be influenced in such a way that the contact angle between the surfaces and the cooling liquid is reduced.

In this case the invention proceeds from the acquired knowledge that the cooling liquid flushing a plate element of the cell for cooling purposes can contain gas bubbles which adhere to the plate element—instead of the cooling liquid—when the plate element is flushed for the purpose of cooling.

Such gas bubbles can be for example gas or air bubbles resulting due to outgassing—if the cooling liquid is heated—or gas that has previously not been purged. Other causes for such gas bubbles can be remaining gas residues during a cooling liquid filling operation or leakages in the cooling system. Furthermore, such gas bubbles can also arise due to outgassing of dissolved constituents during heating, due to evaporation of cooling liquid and/or, specifically in the case of electrolysis, due to decomposition of water.

Expressed in simplified terms, cooling liquid and gas bubbles compete for adhesion to the surface of the plate element, the gas bubbles adhering locally to the plate element surface.

This can lead to localized interruptions in heat abstraction from the plate element into the cooling liquid at these points. As a consequence thereof it can thus lead there to localized overheating and consequential damage, for example membrane damage, in an interior of the cell or, as the case may be, in the interior of a cell structure.

The invention is based further on the consideration that when there is an increase in wettability of the surface of the plate element it is made easier for the cooling liquid to dislodge the gas bubbles from the surface and transport them away.

In other words, the gas bubbles are detached from or no longer adhere to the plate element surface, remain thus in a state of suspension in the cooling liquid and can be discharged from the cell by (cooling) flow and/or convection.

It has surprisingly transpired here that particularly at a contact angle of less than 90° between the plate element surface and the respective cooling liquid a substantial reduction in the adhesion of gas bubbles to the plate element surface is brought about or, as the case may be, said bubbles are detached more quickly from the plate surface again and consequently the bubbles can be transported away more quickly from the cell.

As a result, process heat from the electrochemical cell can be dissipated without interruption or practically without interruption from the plate element into the cooling liquid. Localized occurrences of overheating and consequential damage—as a result of the previous poor heat dissipation caused by gas bubble adhesion—in the interior of the cell or in the interior of the cell structure can be avoided. Efficient and easily achievable cooling of the cell is ensured by means of the invention.

The invention exploits this surprising knowledge and makes inventive provision in the electrochemical cell for the cell plate element to have a plate element surface in which the contact angle between the surface and the cooling liquid wetting the surface is less than 90°.

The invention exploits this surprising knowledge also, and also makes inventive provision in the production method for performing the additional or further, alternative or modified method step influencing the plate element surfaces that are wettable for cooling purposes, by means of which method step a contact angle between the surface and the cooling liquid is reduced.

The invention therefore increases the wettability of the plate element surface by performing the additional method step, for example by means of a mechanical surface treatment, an electrical surface treatment, such as ion etching, or else a chemical surface treatment, which result in a roughening of the plate element surface—associated with the increased wettability.

In particular this surface treatment can also entail applying a hydrophilic surface layer, such as applying an alloy coating using an alloy forming an oxidically permeated layer or applying a layer equipping the plate element surface with polar groups.

In this case the invention makes available by means of said wettability-increasing step a plate element surface in which the contact angle between the surface and a cooling liquid wetting the surface is less than 90°.

Preferred developments of the invention will emerge from the dependent claims. The developments relate both to the electrochemical cell according to the invention and to the inventive method for producing a chemical cell.

Thus, it is provided according to a preferred development that the cooling liquid is water, in particular having predetermined purity, for example deionized water.

The plate element, such as a bipolar plate, can be a surface-treated, in particular formed, specifically deep-drawn metal sheet. Preferably the plate element is embodied as two surface-treated, in particular deep-drawn, metal sheets arranged against each other (double sheet). Alternatively the bipolar plate can also be a solid, surface-treated, formed metal sheet.

The forming of the metal sheet can in this case consist in deep-drawing and/or stamping, in particular stamping a structure, such as a stud structure or a channel structure.

In this case the double sheets can be formed in such a way that—when they are arranged against each other—cooling channels through which the cooling liquid flows are formed between the metal sheets, whereas in contrast channels for fuel gases of the cell are embodied on their outwardly oriented surfaces.

According to a preferred development it is provided that the contact angle is significantly less than 90°. Thus, it can be less than 80°. In particular, the contact angle can be less than 70° or less than 60°.

Particularly with increased heat production in the cell, the outgassing from the cooling liquid is increased, such that according to developments of the invention smaller contact angles are provided here. The more gas bubbles are thus present in the cooling liquid, these can be transported away here quickly for lack of adhesion or, as the case may be, good detachment. In particular in the case of very gaseous cooling liquid it can be provided to set the contact angle to less than 80°. It has furthermore also been revealed that a vastly improved heat removal can be effected in particular at contact angles of less than 70°. An adhesion of gas bubbles to the plate element surface is virtually ruled out if the plate element surface realizes the contact angle at less than 60°.

In a further preferred development the plate element has a metal sheet having at least one noble metal layer, for example lying in the range of 0.05-2.0 µm, in particular having at least one gold layer, or a plurality of stacked, thin, for example each lying in the range of 0.05-2.0 µm, noble metal layers or gold layers.

Said noble metal layer or noble metal layers can be deposited onto the metal sheet in particular by sputtering.

In this case in particular such a gold coating—applied to the metal sheet, for example a thin metal sheet having a sheet thickness in the range of 0.1 mm up to several centimeters, in particular having a metal sheet thickness of approx. 0.15 mm, —establishes an adequate electrical conductivity. The metal sheet thickness can in this case be dependent on a material of the metal sheet, on mechanical loads acting on the metal sheet and/or on a metal sheet design.

The surface treatment development according to the invention is preferably a mechanical or electrical or chemical surface finishing process, in particular ion etching ("back-sputtering"), profiling, sandblasting, emerizing, calendering, brushing and/or structure stamping.

Particularly by means of methods of said kind, which are generally known and proven, it is achieved that—by means of surface roughening or surface coarsening effected therewith—the contact angle provided according to the invention or that the contact angle reduction according to the invention is realized.

To put it another way, the additional method step can entail a mechanical or chemical or electrical surface finishing process, in particular surface roughening, ion etching ("back-sputtering"), profiling, sandblasting, emerizing, calendering, brushing and/or structure stamping.

In this case the, in particular mechanical, surface treatment can be performed at different times during the production process. Thus, it can be provided that the mechanical surface treatment is performed during the production of the plate elements, in particular during a production of metal sheets forming the plate elements, after the production of the metal sheets and before a forming of the metal sheets, during the forming of the metal sheets, after the forming of the metal sheets and before coating of the metal sheets, or after the coating of the metal sheets, or that the surface treatment is performed after the production of the plate elements and before the layering of the plate elements.

Furthermore, it can also be preferably provided that the plate element has an alloy coating containing an alloy, which alloy in addition to a noble metal alloy component ("noble component"), in particular gold, has at least one ignoble metal alloy component forming an oxidically permeated layer ("ignoble component"), in particular aluminum or titanium.

In this case the application of the alloy coating is intended here to be the additional method step according to the invention.

The noble component of the alloy ensures—after the alloy has been applied to the plate element—a good electrical contact, while the ignoble component of the alloy, following its application and abreaction with atmospheric oxygen, forms an oxidic, polar and consequently hydrophilic fraction or surface which exerts the influence according to the invention on the wettability of the plate element surface.

Particularly the embodied hydrophilicity of the ignoble component effects the paramount liquid wetting before gas bubble adhesion to the plate element surface and leads to the improved heat dissipation.

It can furthermore be preferably provided here that a mass fraction ratio of the noble metal alloy component and the at least one ignoble metal alloy component of the alloy forming an oxidically permeated layer lies roughly in a range from 90:10 to 99:1. An adequate electrical conductivity, with sufficient wettability, is achieved by this means.

In a further development it is provided that the plate element is an, in particular deep-drawn, metal sheet on which the alloy coating—to be understood as an additional method step within the meaning of the invention—is or will be directly applied.

Directly, in this context, can be understood in the sense that no other layer—except for said alloy layer—is provided in the case of the metal sheet of the plate element.

Alternatively it can also be provided that the plate element or metal sheet has at least one noble metal layer, in particular a gold layer, on which the alloy coating is or will be applied in the additional method step according to the invention.

To put it another way, it is provided according to these developments that either the alloy layer is provided instead of an originally provided noble metal layer, for example a gold layer, —in short, the alloy layer replaces the original gold coating—or that the alloy layer is applied to the original noble metal layer in addition.

Good adhesion of the alloy layer is achieved by applying the alloy coating—with noble component—to the noble metal layer.

It can also be provided in addition here—if the noble metal layer is retained—that the plate element has a multiple noble metal coating of such kind, in particular a triple or quadruple gold coating, over which the alloy coating is or will then be applied.

In a further preferred development it is provided that the plate element has at least one noble metal layer, in particular a gold layer, on which a hydrophilic coating is or—within the meaning of the additional method step according to the invention—will be applied.

Said hydrophilic coating can be a metal layer forming an oxidically permeated layer, in particular an aluminum or titanium layer.

The hydrophilic coating effects the paramount liquid wetting before gas bubble adhesion to the plate element surface and leads to improved heat dissipation.

It can also be preferably provided that the plate element has a surface function coating having at least one hydrophilic fraction—or is provided with such a coating—within the meaning of the additional method step according to the invention —, which surface function coating equips the surface of the plate element with polar groups, in particular OH groups or CO groups or SiO groups, for an interaction with a cooling liquid.

To put it another way, applying the surface function coating in this case constitutes a development in the sense of the additional method step according to the invention.

In a further development it is provided that the plate element is an, in particular deep-drawn, metal sheet to which said surface function coating—to be understood as an additional method step within the meaning of the invention—is or will be directly applied.

Alternatively it can also be provided that the plate element has at least one noble metal layer, in particular a gold layer, to which the surface function coating is or will be applied in the additional method step according to the invention.

To put it another way, it is provided according to these developments either that the surface function coating is provided instead of an originally provided noble metal layer, for example a gold layer, —in short, the surface function coating replaces the original gold coating—or that the surface function coating is applied to the original noble metal layer in addition.

It can further be provided here that the surface function coating has molecules having an anchor group based on phosphonic acid or sulfonic acid or on thiol.

In particular it can also be provided here that the surface function coating is thinner than 10 nm, in particular thinner than 8 nm or 6 nm.

In another preferred development it is provided that the surface function coating is applied in such a way that a solvent is produced containing molecules of the surface function coating, for example having a 0.1-2 percent by weight fraction of the coating molecule in the solvent.

The plate element or plate elements to be coated with the surface function coating is or are immersed in said solvent for a predefinable time, for example a moment of brief immersion, a few minutes, up to several hours.

The plate element or plate elements is or are then removed from the solvent and rinsed, in particular with water.

It can also be particularly preferably provided that the electrochemical cell is a galvanic cell, in particular a PEM fuel cell or an electrolytic cell.

The description of advantageous embodiments of the invention presented thus far contains numerous features which are reproduced, in some cases with several in combination, in the individual dependent claims. However, the person skilled in the art will beneficially consider said features also individually and arrange them into other meaningful combinations. In particular these features can be combined individually in each case and in any suitable combination with the inventive method of the independent claim.

The above-described characteristics, features and advantages of the present invention, as well as the manner in which they are achieved, will become clearer and more readily understandable in connection with the following description of the exemplary embodiments, which are explained in more detail in conjunction with the drawings.

The invention is not, however, limited to the combination of features disclosed in the exemplary embodiments, including not in relation to functional features. Thus, features of any exemplary embodiment that are suited to the purpose can also be considered explicitly in isolation, removed from one exemplary embodiment, incorporated into another exemplary embodiment in order to complement the latter, and/or combined with the inventive method of the independent claim.

BRIEF DESCRIPTION OF THE SEVERAL VIEWS OF THE DRAWING

FIG. 1 shows a detail of a PEM fuel cell according to an exemplary embodiment;

FIG. 2 shows a detail of a plate element of a PEM fuel cell with noble metal coating and alloy layer according to an exemplary embodiment;

FIG. 3 shows a workflow of method steps in the production of a PEM fuel cell according to an exemplary embodiment;

FIG. 4 shows a production of a PEM fuel cell having resist-coated plate elements with reduced contact angle according to an exemplary embodiment; and FIG. 5 shows a detail of a plate element of a PEM fuel cell according to an exemplary embodiment.

DESCRIPTION OF THE INVENTION

FIGS. 1 and 5 each show a detail of a structure 6 of a PEM fuel cell 1 (abbreviated in the following to just fuel cell or cell).

In said fuel cell 1, hydrogen (H2) and oxygen (O2) (fuel gases) react at an electrolyte, giving off heat in the process, to produce electrical energy and product water, which—together with condensed-out humidification water—is discharged from the fuel cell 1.

As FIGS. 1 and 5 shows, the—layered—structure 6 of the cell 1 provides membranes 11 which are in each case sandwiched between a GDL 19 on either side (membrane electrode units 20). Electrodes are disposed therebetween in each case. The electrode on the hydrogen side is called the anode; the electrode on the oxygen side is called the cathode.

In addition, as FIGS. 1 and 5 show, the layered structure 6 of the cell 1 provides plate elements or bipolar plates 2 arranged between the membrane electrode units 20. In this instance these are in each case embodied as thin, coated and formed (double) metal sheets 12.

The heat resulting from the reaction of hydrogen (H2) and oxygen (O2) in the fuel cell 1 requires the fuel cell 1 to be efficiently cooled in order to prevent damage to the fuel cell 1, in particular damage to an active membrane 11 of the fuel cell 1.

In order to cool the fuel cell 1, the latter is supplied or, as the case may be, flushed with cooling liquid 5, in this case deionized water, as a result of which the heat is dissipated—by way of the cooling liquid 5—from the fuel cell 1.

For that purpose—as also for supplying the cell 1 with the fuel gases hydrogen and oxygen—the bipolar plate provides a stud or channel structure or a stud or channel structure is stamped into the metal sheets 12 forming the bipolar plate 2.

As a result, as FIGS. 1 and 5 show, cooling channels 17 (cooling unit 4) are formed between the metal sheets 12 forming a bipolar plate 2, as also fuel gas channels 16 are produced on their "outwardly oriented" surfaces. The metal sheets 12 provide a gold coating 7 on said "outwardly oriented" surface.

The cell 1 is supplied with the cooling liquid 5 via the coolant channels 17; the cell 1 is supplied with the fuel gases via the fuel gas channels 16.

In addition, the "inner" metal sheet surfaces 3 of a bipolar plate 2 or the metal sheet surfaces 3 in each case delimiting a cooling channel 17 are embodied in such a way that a contact angle of approximately 60° is realized there between the respective surface 3 and the cooling liquid 5, as a result of which the fuel cell 1 is able to ensure efficient cooling.

This is based on the consideration that when the wettability of the surfaces 3 that are provided for cooling of the bipolar plate 2 or of the metal sheets 12—realized by means a contact angle reduced to 60°—it is made easier for the cooling liquid 5 to dislodge gas bubbles adhering to the surface 3 and transport these away out of the cell.

On account of the small contact angle the gas bubbles 18 in the cooling liquid 5 do not (any longer) adhere to the metal sheet surface 3, thus remain in a state of suspension in the cooling liquid 5 and can be discharged from the cell 5 by means of the (cooling liquid) flow 5 in the cooling channel 17.

As a result, the process heat of the cell 1 can be dissipated without interruption or practically without interruption from the bipolar plate 2 into the cooling liquid 5. Efficient and easily achievable cooling of the cell 1 is ensured.

FIG. 2 shows a detail section of a metal sheet surface 3, wetted by the cooling liquid 5, of one of the metal sheets 12 of the double sheet 12 forming the bipolar plate 2, thereby illustrating how the realization of the contact angle reduced here or, as the case may be, of the contact angle of approx. 60° is achieved.

Corresponding measurement methods for measuring a contact angle, for example a plate method according to Neumann, a Wilhelmy plate method or a drop method, are known—and can be applied—for checking purposes—accordingly.

As FIG. 2 shows, the thin metal sheet 12 is provided here with a thin gold coating 7—or alternatively thereto with several, e.g. three or four, thin gold layers 7.

Furthermore, the metal sheet 12 is provided with an additional reactive layer 8 made from a hybrid alloy. Said hybrid alloy possesses a noble component, in this case gold (as also the "primary coating"), as well as an ignoble component, in this case aluminum.

The noble component guarantees good electrical contact and also ensures adequate adhesion of the alloy layer 8 to the gold coating 7.

After abreacting with atmospheric oxygen, the ignoble component forms an oxidic, polar and consequently hydrophilic fraction which exerts the influence on the wetting behavior (contact angle reduction).

The mass fraction ratio of the noble component to the ignoble alloy component forming the oxidic passive layer is chosen here as 95:5. The alloy layer is applied to a thickness of 0.1 μm by sputtering, a gold/aluminum (AU/AL) alloy target being used.

Instead of the alloy coating or alloy layer 8 on the gold layer 7, it is also possible as an alternative thereto to provide a direct alloy coating 8 having said alloy directly on the thin metal sheet 12 (not shown). In this case, too, said direct or only alloy layer 8 can be applied by sputtering.

In a further alternative the ignoble component can also be applied—on its own—as a thin layer 10 to the gold layer 7. Here also, a sputter method can be used for that purpose. This layer, too, can, after abreacting with atmospheric oxygen, form an oxidic, polar and consequently hydrophilic fraction which exerts the influence on the wetting behavior (contact angle reduction).

The contact angle reduction—and thereby resulting increased wettability of the metal sheet surface 3 by means of the cooling liquid 5—can also be achieved by mechanical finishing of the metal sheets 12 or mechanical surface treatment.

A coarsening or increased roughening of the metal sheet surface 3 is achieved by means of said mechanical surface treatment 100, thereby producing the increased wettability of the surface 3.

FIG. 3 illustrates—with reference to a previously conventional method workflow for producing a fuel cell 1—such an additional mechanical surface treatment 100—which can be provided at different times during the previously conventional method workflow —, by way of illustration emerizing or calendering, which increases the wettability of the surface 3 or reduces the contact angle of the surface 3.

As FIG. 3 shows, during the production of the fuel cell 1—according to the previous approach—the metal sheets are produced first 200. Toward that end, sheet metal "blanks" are produced and are cut accordingly 210.

Next, the metal sheets 12 are formed 220, with structures such as studs being incorporated 220 into the metal sheets 12 by means of a stamping process.

The metal sheets 12 are subsequently coated with the gold coating 7.

Thereafter, the metal sheets 12 are layered 300, with two metal sheets 12 in each case being stacked to form a double sheet, i.e. to form the bipolar plate 2.

When the metal sheets 12 forming the bipolar plate 2 are fixed, cooling channels 17 are embodied between the opposite "inner" surfaces 3 of said metal sheets 12, the surfaces 3 thereof being in contact with the cooling liquid flowing through 320 the cooling channels 17 (cooling unit 4).

In a further layering step, the membrane electrode units 20 are arranged between the bipolar plates 2, the layered structure 6 of the cell 1 being completed 300.

As FIG. 3 further shows, the mechanical surface treatment 100 or the emerizing or calendering is provided as an additional method step 100—at different times—during the production of the fuel cell 1.

As FIG. 3 shows, the mechanical surface treatment 100 or the emerizing or calendering is performed already during the sheet metal blank production step 210.

FIG. 3 also illustrates that it is possible to perform the emerizing or calendering 100 also
- after the sheet metal blank production step 210 and before forming 220 of the metal sheets 12, or
- during the forming 220 of the metal sheets 12, or
- after the forming 220 of the metal sheets 12 and before coating 230 of the metal sheets 12, or
- after the coating 230 of the metal sheets 12 and before the layering 310.

The coarsening or increased roughening of the surface 3 is achieved by means of said mechanical surface treatment 100, thereby producing the increased wettability of the surface 3—and consequently the improved heat dissipation.

FIG. 4 illustrates a further production of the fuel cell with reduced contact angle or, as the case may be, contact angle of approx. 60°.

According to FIG. 4, it is provided to coat the surface of the gold-coated metal sheets 12 with a few nm thin function layer 9, a resist 9, which has adequate electrical conductivity and equips the surface 3 of the metal sheets 12 with polar groups.

For this purpose said resist 9 has molecules having a phosphonic- or sulfonic-acid-based anchor group—or else a thiol-based anchor group. Polar groups which in this case have migrated away from the gold surface can be realized for example by means of OH groups, CO groups or SiO groups. This makes the surface 3 of the metal sheets 12 more hydrophilic, thus increasing the wetting capability and heat dissipation.

The application 500 of the resist layer 9 is performed, as FIG. 4 also shows, in that a solvent containing the molecules, for example with 0.1-2 percent by weight fraction of the molecules in the solvent, is produced 510.

The gold surface to be coated is dipped into the aqueous solution and left therein for approx. 1 hour, if necessary under increased temperature, 520.

The substrate is subsequently removed and rinsed with water 530.

Although the invention has been illustrated and described in greater detail on the basis of the preferred exemplary embodiments, it is not limited by the disclosed examples and other variations can be derived herefrom by the person skilled in the art without leaving the scope of protection of the invention.

The invention claimed is:

1. An electrochemical cell, comprising:
    at least two plate elements to be cooled by a liquid coolant, said plate elements being disposed to form reactant channels therebetween and having coolant channels for conducting the coolant, each said coolant channel of said plate elements having a surface to be wetted by the coolant for the purpose of cooling;
    said surface to be wetted by the coolant having a hydrophilic coating being an alloy having at least two alloy components, said at least two alloy components including a noble metal alloy component and at least one ignoble metal alloy component, and said hydrophilic coating being a layer permeated by oxides; and
    said surface defining a contact angle between said surface and the coolant wetting said surface of less than 90°.

2. The electrochemical cell according to claim 1, wherein said contact angle is less than 60° and the liquid coolant is deionized water.

3. The electrochemical cell according to claim 1, wherein said noble metal alloy component is gold and said ignoble metal alloy component is aluminum or titanium.

4. The electrochemical cell according to claim 1, wherein said plate element includes at least one noble metal layer to which said hydrophilic coating is applied.

5. The electrochemical cell according to claim 4, wherein said at least one noble metal layer is a gold layer.

6. The electrochemical cell according to claim 1, wherein said hydrophilic coating is a surface function coating containing at least one hydrophilic fraction that equips said surface of said plate element with polar groups for an interaction with the coolant.

7. The electrochemical cell according to claim 6, wherein said polar groups are OH groups or CO groups or SiO groups.

8. The electrochemical cell according to claim 6, wherein said surface function coating comprises molecules having an anchor group based on a material selected from the group consisting of phosphonic acid, sulfonic acid, and thiol.

9. A method of producing an electrochemical cell having a plurality of plate elements to be cooled by a liquid coolant, each of the plate elements having a surface to be wetted by the coolant for cooling the respective plate element, the method comprising:
    producing the plate elements with the surface to be wetted having a plurality of planar surfaces;
    alternatingly layering the plate elements with membrane units and thereby forming a layered structure of the electrochemical cell having reactant channels and coolant channels in the plate elements formed by the surfaces to be wetted; and
    influencing the surfaces of the plate elements to be wetted for cooling purposes by forming a hydrophilic coating being an alloy with at least two alloy components, the at least two alloy components including a noble metal alloy component and at least one ignoble metal alloy component, and the hydrophilic coating being a layer permeated by oxides on the surfaces of the coolant channels and reducing a contact angle between the surfaces and the coolant.

10. The method according to claim 9, wherein the influencing step comprises a surface finishing process selected from the group consisting of mechanical, electrical, and chemical surface finishing processes.

11. The method according to claim 10, wherein the influencing step comprises at least one process selected from the group consisting of ion etching ("back-sputtering"), profiling, sandblasting, emerizing, calendaring, brushing, and structure stamping.

12. The method according to claim 9, which comprises applying the hydrophilic coating to metal sheets forming the plate elements, or providing plate elements coated with a noble metal layer and applying an alloy layer to the noble metal layer on the plate elements.

13. The method according to claim 9, wherein the influencing step comprises coating the plate elements with a surface function coating having at least one hydrophilic fraction that equips the surface of the plate element with polar groups for an interaction with a coolant.

14. The method according to claim 13, wherein the polar groups are selected from the group consisting of OH groups, CO groups, and SiO groups.

15. The electrochemical cell according to claim 1, wherein said surface of said plate element to be wetted by the coolant is formed with a plurality of planar surfaces.

\* \* \* \* \*